(12) United States Patent
Aroya

(10) Patent No.: US 7,757,218 B2
(45) Date of Patent: Jul. 13, 2010

(54) METHOD OF INSTRUMENTING CODE HAVING RESTRICTIVE CALLING CONVENTIONS

(75) Inventor: Ishai Ben Aroya, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1363 days.

(21) Appl. No.: 11/088,452

(22) Filed: Mar. 24, 2005

(65) Prior Publication Data

US 2006/0218537 A1    Sep. 28, 2006

(51) Int. Cl.
G06F 9/44    (2006.01)
G06F 3/00    (2006.01)

(52) U.S. Cl. .................................. 717/130; 719/328
(58) Field of Classification Search .................. None
See application file for complete search history.

(56) References Cited

U.S. PATENT DOCUMENTS

| | | | |
|---|---|---|---|
| 5,732,273 A * | 3/1998 | Srivastava et al. | 717/128 |
| 6,481,008 B1 | 11/2002 | Chaiken et al. | |
| 7,107,579 B2 * | 9/2006 | Tsai et al. | 717/127 |
| 7,475,394 B2 * | 1/2009 | Calder et al. | 717/158 |
| 7,519,944 B2 * | 4/2009 | Havin et al. | 717/106 |
| 2002/0152455 A1 * | 10/2002 | Hundt et al. | 717/131 |
| 2002/0196678 A1 | 12/2002 | Haber et al. | |
| 2004/0098707 A1 * | 5/2004 | Tang et al. | 717/130 |
| 2006/0004895 A1 * | 1/2006 | Kim | 707/205 |

FOREIGN PATENT DOCUMENTS

WO    WO 97/14096 A    4/1997

OTHER PUBLICATIONS

Extended European Search Report for European Patent Application No. EP 06 11 1550 dated Feb. 12, 2010.

* cited by examiner

Primary Examiner—Tuan Q Dam
Assistant Examiner—Hanh T Bui
(74) Attorney, Agent, or Firm—Wolf, Greenfield & Sacks, P.C.

(57) ABSTRACT

A development environment for computer programs in which programs under test may be instrumented with probe functions. The probe functions are called through a wrapper function structured to comply with restrictive calling conventions of the platform for which the computer program is developed. By complying with the calling convention, proper operation of the computer program is achieved during testing even if an exception handler, or other program element that relies on compliance with the calling convention, is invoked. Once instrumented, the computer program may be tested to determine whether it executes desired logic function to determine the performance of the program or for other test functions.

19 Claims, 5 Drawing Sheets

```
                                114 ─── {Load Parameters in Volatile Registers}
                             115 ─────── {Load Parameters in Stack Frame}
        110                  112 ─── call    OriginalFunction
                             116 ─── {Unload Volatile Register}
```

```
                                                                          152
OriginalFunction:
00000000`00401a00  85c9              test    ecx,ecx
00000000`00401a02  742f              jz      foo!_ftbuf+0x33 (0000000000401a33)
00000000`00401a04  53                push    rbx
00000000`00401a05  4883ec20          sub     rsp,0x20
00000000`00401a09  0fba62180c        bt      dword ptr [rdx+0x18],0xc
00000000`00401a0e  488bda            mov     rbx,rdx
00000000`00401a11  731b              jnb     foo!_ftbuf+0x2e
(0000000000401a2e)
00000000`00401a13  488bca            mov     rcx,rdx
00000000`00401a16  e8352c0000        call    foo!_flush (0000000000404650)
00000000`00401a1b  816318ffeeffff    and     dword ptr [rbx+0x18],0xffffeeff
00000000`00401a22  33c0              xor     eax,eax
00000000`00401a24  488903            mov     [rbx],rax
00000000`00401a27  48894310          mov     [rbx+0x10],rax
00000000`00401a2b  894324            mov     [rbx+0x24],eax
00000000`00401a2e  4883c420          add     rsp,0x20         ⎫
00000000`00401a32  5b                pop     rbx              ⎬ 154
00000000`00401a33  c20000            ret     0x0              ⎭
                                                   156
                                                                          150
```

```
OriginalFunction:
00000000`00401a00 85c9              test      ecx,ecx
00000000`00401a02 742f              jz        foo!_ftbuf+0x33 (0000000000401a33)
00000000`00401a04 53                push      rbx
00000000`00401a05 4883ec20          sub       rsp,0x20
00000000`00401a09 0fba62180c        bt        dword ptr [rdx+0x18],0xc
00000000`00401a0e 488bda            mov       rbx,rdx
00000000`00401a11 731b              jnb       foo!_ftbuf+0x2e
(0000000000401a2e)
00000000`00401a13 488bca            mov       rcx,rdx
00000000`00401a16 e8352c0000        call      foo!_flush (0000000000404650)
00000000`00401a1b 816318ffeeffff    and       dword ptr [rbx+0x18],0xffffeeff
00000000`00401a22 33c0              xor       eax,eax
00000000`00401a24 488903            mov       [rbx],rax
00000000`00401a27 48894310          mov       [rbx+0x10],rax
00000000`00401a2b 894324            mov       [rbx+0x24],eax
00000000`00401a2e 4883c420          add       rsp,0x20
00000000`00401a32 5b                pop       rbx
               eb00                 jmp       NewFunction2
```

256

```
NewFunction2:
                    push    rcx
                    push    rdx      ⎱ 264
                    sub     rsp, 0x10  ⎰ 268
                    mov     rcx, ZZZZ
         262        mov     rdx, WWWW
                    call    ProbeFunction2
                    add     rsp, 0x10  ⎱
                    pop     rdx        ⎰ 266
                    pop     rdx
                    ret — 270
```

METHOD OF INSTRUMENTING CODE HAVING RESTRICTIVE CALLING CONVENTIONS

BACKGROUND OF INVENTION

1. Field of Invention

This application relates generally to software development and more specifically to tools for testing software.

2. Discussion of Related Art

As software programs are developed, it is often desirable to test the programs to determine that they operate as intended. As software programs have gotten larger and more complex, it has become more likely that a program will execute too slowly, consume too much memory or otherwise not deliver a desired level of performance even when all portions of the program produce the desired outputs.

It is often desirable to test the program to determine whether it delivers a desired level of performance. Where a software program does not deliver a desired level of performance, a performance engineer may analyze the program as it executes to identify portions that can be modified to improve performance.

To facilitate performance engineering, software development systems include tools that can "instrument" a program. "Instrumenting" a program generally involves inserting calls to special functions, called "probes." Each probe records information about the operating state of the program in which the probe is inserted each time it is executed. For example, a probe may be inserted in a program before the program calls a particular function and a second probe may be inserted in that program after the call to that function. When these probes are executed, each may write into a log file the time at which it executed. By analyzing the log file, a performance engineer may determine the amount of time required to execute the function.

As another example, probes may be inserted at the beginning and end of each function. Information gathered by these probes may be used to analyze the number of times each function is executed or the execution time for each call to the function. Such performance information is important when analyzing a relatively complex program.

For the results obtained by analyzing an instrumented program to be a reliable indication of the performance of the program in actual operation, adding probes should disrupt the operation of the program as little as possible. Accordingly, probes are generally inserted into the binary or executable file containing the program to be analyzed. The binary file contains the program after it has been fully optimized and compiled. Therefore inserting probes does not alter the optimization or compilation processes.

To insert probes into the binary file, the binary file is disassembled to identify specific locations in the program where probes are desired. For example, a function table is often included as part of a binary file to specify the beginning of the instructions representing each function Probes also should not introduce errors into the running program, such as by altering the storage of variables or disrupting the format in which information relied on by the executing program is stored. A software system in which application programs are written may impose various programming conventions, particularly concerning the altering of register values in functions.

For example, many widely available applications have been developed for the X86 processor family with a particular calling convention. To comply with this calling convention, a compiler processing a program to run on an X86 processor may implement each function with a prologue and an epilogue portion. In the prologue, the function pushes onto the stack the values in each register that the function alters. In the epilogue portion, the function restores the values of these registers by popping them off the stack. Any other routine or tools written to interact with such a function may assume that information is stored in accordance with the calling convention. If the information is not stored in accordance with the calling convention errors may result.

The specific calling conventions may be customized for the processor on which the program is intended to operate. For example, a calling convention may be designed to use instructions that the processor executes quickly. Accordingly, each platform formed by a combination of a software system and a processor on which that software system is intended to operate may have a different calling convention. For example, some platforms incorporate the processors that include the 64-bit extension of the X86 processor family. Such processors are available under names such as AMD64 or EMT64T These processors are collectively referred to as having the X64 extension. Platforms based on processors with the X64 extension may use a different calling convention than similar platforms based on the X86 processor without the extension.

It would be desirable to instrument a program developed for an X64 platform or other applications using calling conventions in which traditional instrumentation approaches could introduce errors.

SUMMARY OF INVENTION

The invention relates to a method of instrumenting a program developed for a platform in which traditional instrumentation approaches could introduce errors. According to the process, probes are called from within wrapper functions. The wrapper functions allow probe functions to be called without violating calling conventions of the platform.

In one aspect, the invention relates to a method of instrumenting a software program with at least one probe function adapted to record operating information at a location within the software program. The method comprises modifying the software program to transfer control to a wrapper function, the wrapper function comprising at least one computer-executable instruction that calls the probe function.

In another aspect, the invention relates to a method of testing a software program on a platform having registers having values and a calling convention in which the value in at least one of the registers is preserved upon a function call. The method is of the type that includes executing at least one probe function at an instrumented location in the program. According to the method the software program is executed and, at the instrumented location, transfers control to a wrapper function. Within the wrapper function, the state of the platform is preserved, the probe function is called, and the state of the platform is restored.

In another aspect, the invention relates to a computer-readable medium having computer-executable instructions for implementing a development environment for a software program. The computer-executable instructions modify a binary file containing an executable version of the software program to include a probe function and a wrapper function that calls the probe function; identify an identified location in the binary file where a probe function is to be executed; and provide at the identified location a transfer of control instruction that transfers control to the wrapper function.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE PREFERRED EMBODIMENT

We have recognized a problem in instrumenting computer programs written for a platform using a restrictive calling convention. One example of such a calling convention is used in a platform comprising Microsoft® Windows® Operating System for processors with a X64 extension.

Figure 1:
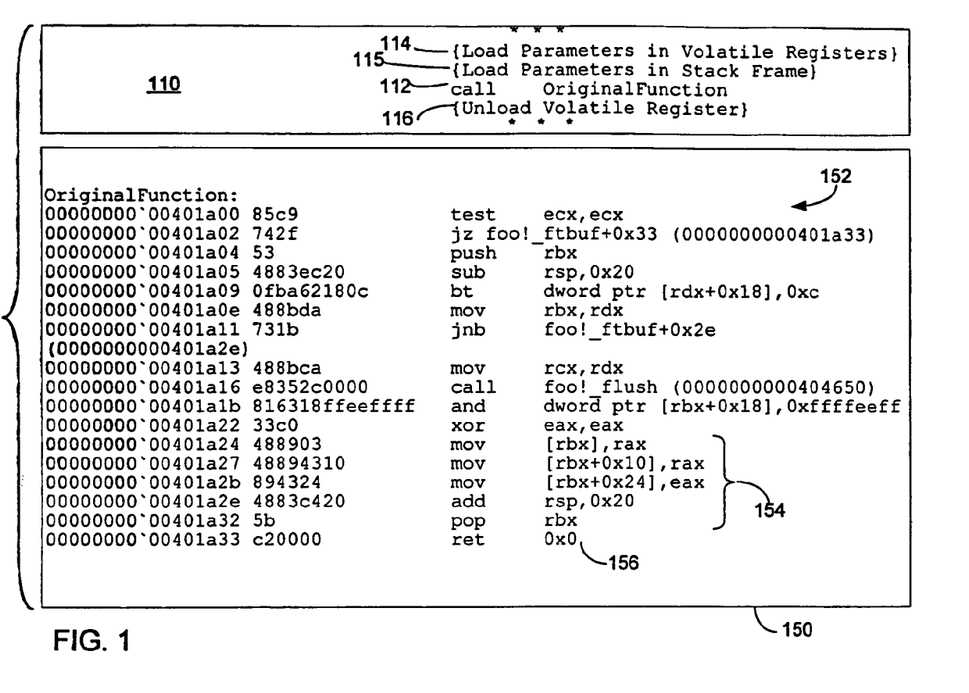
FIG. 1 is a representation of a portion of a program to be instrumented.

FIG. 1 gives an example of the assembly level version of code generated for this platform. FIG. 1 may for example, represent a display created by disassembling a portion of an executable file. A portion of a calling program 110 is illustrated. Calling program 110 includes an instruction 112 that calls a function, here denoted "OriginalFunction."

Called function 150 represents "OriginalFunction" in this example. Called function 150 ends with a return instruction 156. Return instruction 156 returns program control to the calling program 110 at the instruction following the function call 112. According to the calling convention used in this example, certain of the registers in the processor are used for passing parameters to called functions. The called function may modify the values in those registers without violating the calling convention. More generally, registers that may be returned to a calling program from a called function with modified values are denoted "volatile registers."

As part of a function call, the values of parameters to be used by the function are loaded into volatile registers by the calling program 110 In this example, pre-call instructions 114 store the values of parameters to the function in volatile registers.

If more parameters are required than can be stored in the volatile registers, additional parameters may be stored in a defined location in a stack frame associated with calling program 110. Precall instructions 115 indicate instructions that store parameters on the stack. The calling program 110 also includes post-call instructions 116 that unload the values representing results of the function from the volatile registers after function call 112. If more results are to be returned than can fit in the volatile registers, the are stored in predefined locations in a stack frame associated with calling program 110.

According to this convention, called function 150 may modify the volatile registers without disrupting the operation of calling programming 110. Other registers are considered nonvolatile registers. If called function 150 modifies any nonvolatile registers, it must store the values in those registers and restore them before returning to calling program 110. Accordingly, called function 150 includes a prologue portion 152 that stores the state of any nonvolatile registers that may be modified in called function 150. Called function 150 also includes an epilogue portion 154 that restores the state of any nonvolatile registers stored in the prologue 152. When called function 150 is compiled, sufficient memory space for storing all the required nonvolatile registers must be allocated.

In many instances, storage space is allocated for each function as it executes in a memory structure implemented as a stack. Upon each call to a function, a new stack frame is created. Creating a stack frame dynamically allocates storage that can be used by a function. When the function finishes execution, the stack frame may be popped from the stack, allowing that storage space to be reused by other portions of the program.

In some instances, a frame pointer is used to identify the beginning of a stack frame. In such an embodiment, the amount of information to remove from the stack to pop one stack frame may be identified from the frame pointer. In other instances, the size of the stack frame for a function is fixed at compile time. The stack pointer marks the bottom of the stack frame. The amount of information to remove from the stack to pop one stack frame may therefore be identified by offsetting the stack pointer by the size of the stack frame. Where a calling convention allows either approach to be used to identify the size of stack frames, adding probes to a program should not produce errors for either approach.

Other functions or portions of the program may rely on the stack having a format prescribed by the calling conventions. Arranging the memory in a predetermined format is important, for example, in handling exceptions. Upon occurrence of an exception, it is often necessary to terminate an executing function without processing through its normal function prologue. The program responding to the exception condition, often called an "exception handler," relies on information about the function such as the size of its stack frame, to "unwind" the stack and place the processing system in a state to resume execution in the calling program at a location after the point where the exception condition occurred.

In order for an exception hander to properly unwind the stack, it must have access to information defining how each stack frame was established, including details such as the size of the stack frame allocated for the called function. In the embodiment described herein, this information is stored in a function table stored as part of a compiled program. At compile time, an entry is made in the function table indicating the size of the stack frame for each function, which is used at runtime to set the size of the stack frame. Any additional information needed to unwind the stack is also stored in the function table.

In the described embodiment, a frame pointer is not used to identify the beginning of a stack frame. Rather, the stack pointer is set to point to the bottom of the stack frame. Storage locations in the stack frame for a particular function are located by indexing relative to the stack pointer. Pushes and pops to the stack are not used once the stack pointer is set to point to the end of the frame. The beginning of the stack frame may be identified by subtracting a predetermined frame size for the current function from the stack pointer.

With this calling convention, merely inserting a call to a probe function in an executable file may not produce the intended results. Storage locations necessary to save parameters to be passed may not be available in the stack frame of the calling program. Additionally, where any part of the calling convention relies on static information—such as the size of the stack frame—the called function may not have a stack frame in which it can store the nonvolatile state of the processor. Pushing the values of nonvolatile registers onto the stack, as may be done with some calling conventions, may alter the stack structure in violation of the calling convention.

Problems caused by violating the calling convention upon insertion of probes into a program are avoided in the described embodiment by using a "wrapper function." As used herein, the term "wrapper function" refers to a function that calls another function. The wrapper function may be a separately added function specifically for that purpose or may serve other functions. The wrapper function is constructed so that inserting a call to the wrapper function in an executable file does not disrupt the calling convention. The wrapper function is configured so that it may call a probe function in compliance with the calling convention of the platform. In the embodiments described below, the wrapper function is inserted in an executable file through a transfer of control instruction targeting the wrapper function at a point in the instrumented program where the probe function should be executed. In addition, the function table in the executable file for the instrumented program is augmented to include a reference to the wrapper function.

In one embodiment, execution of the wrapper function creates a stack frame that includes storage space for any parameters that must be stored for proper operation of the probe function. During execution of the probe, the stack frames for the calling program, the wrapper function, and the probe will comply with the calling conventions of the platform.

Figure 2A:
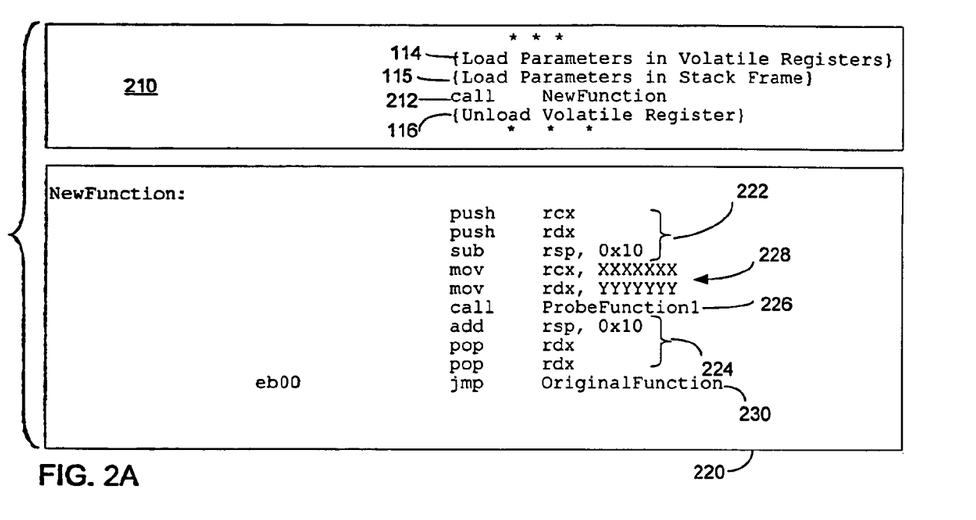
FIG. 2A is a representation of a modified program incorporating a probe function according to one embodiment of the invention.

Specific embodiments may be employed based on the location in the calling program at which a probe function is inserted. FIG. 2A illustrates an embodiment of the invention in which a probe function is inserted at the beginning of a called function. Calling program 210 may represent the same portion of a calling program 110 depicted in FIG. 1. However, the function call 112 (FIG. 1) has been modified to create a function call 212 that targets a function identified as "NewFunction."

Such a modification may, for example, be made using traditional development tools that allow editing of executable code in an automated, semi-automated, or manual fashion. NewFunction is implemented as wrapper function 220. It includes a function call 226 to a probe function. The probe function called at function call 226 may perform operations as known in the art for a probe function executed at the beginning of a called program, such as storing an execution time, storing register values, storing a call stack, etc.

Wrapper function 220 includes a prologue 222 that preserves the state of the platform and sets the stack pointer to indicate the bottom of the stack frame allocated for wrapper function 220. Wrapper function 220 includes a corresponding epilogue 224 that restores the state of the platform and deallocates the stack frame allocated for wrapper function 220 by adjusting the stack pointer. The state of the platform may be reflected by values in registers of the processor. The specific registers that must be stored to preserve the state of the platform depends on the calling convention and may depend on the operation of wrapper function 220 or other functions that wrapper function 220 may call. In the calling convention used as an example herein, the prologue 222 stores the value of volatile and nonvolatile registers modified by wrapper function 220 and the value of any volatile registers that are modified, but not preserved, in the probe function called by wrapper function 220. In the specific example herein, registers RCX and RDX are stored. Wrapper function 220 also includes pre-call instructions 228, such as are discussed below in connection with pre-call instructions 268 of FIG. 2B.

Despite the fact that a call to wrapper function 220 is added after the instrumented program is compiled, wrapper function 220 complies with the calling conventions for the platform. Accordingly, if an exception occurs during execution of either the probe function called at instruction 226 or the wrapper function 220, operation of the exception handler is not hindered by deviations from the calling convention.

Wrapper function 220 ends with a transfer of control instruction, here illustrated as a jump instruction 230. The target of the jump instruction 230 is OriginalFunction, which in this example is the called program 150 as indicated in FIG. 1. As a result, the net effect of executing the function call 212 is the same as execution of function call 112 in the instrumented program, except that the probe function indicated in function call 226 is executed before the original called program 150.

Figure 2B:
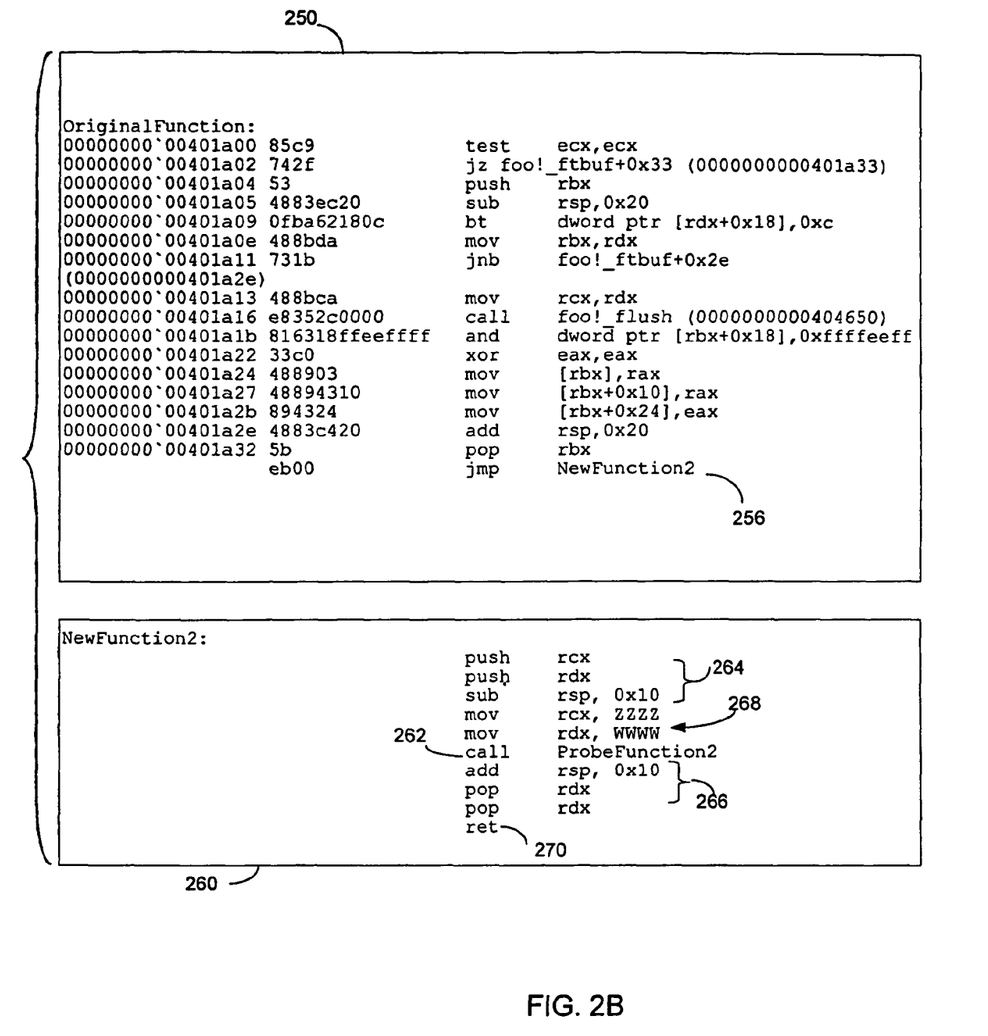
FIG. 2B is a representation of a modified program incorporating a probe function according to a second embodiment of the invention.

FIG. 2B illustrates an embodiment in which a probe function is inserted at the end of a called program. In this embodiment, called program 250 is a modified version of the called program 150. Called program 250 includes all of the instructions of called program 150, except that the return instruction 156 (FIG. 1) is modified. Return instruction 156 is replaced by a jump instruction 256.

As with the embodiment of FIG. 2A, the embodiment presented in FIG. 2B results in the execution of a wrapper function that calls a probe function at a desired location in an instrumented program. In this embodiment, the called program ends with a transfer of control instruction, here jump instruction 256, that transfers control to a wrapper function 260, identified as "NewFunction2."

Execution of wrapper function 260 results in the allocation of a new stack frame. That stack frame includes sufficient space to store the information needed to preserve the state of the program when wrapper function 260 is called. In the illustrated embodiment, wrapper function 260 includes a prologue 264 that establishes a stack frame and preserves the state in accordance with the calling convention. Wrapper function 260 additionally includes an epilogue 266 that restores the state and unwinds the stack frame. Wrapper function 260 also includes pre-call instructions 268 that may be used to initialize the probe function called at function call 262. In this example, pre-call instructions 268 store parameters to be passed to the probe function in registers used for passing arguments to functions in accordance with the calling convention.

Wrapper function 260 ends with a return instruction 270. Because wrapper function 260 was invoked by a jump instruction 256 rather than a call, the return instruction 270 executed at the end of wrapper function 260 has the same effect as a return instruction executed at the end of called program 150 as in the prior art. However, the net effect of executing the instructions illustrated in FIG. 2B is that the probe function called at instruction 262 is executed prior to the return from called program 250.

Figure 3:
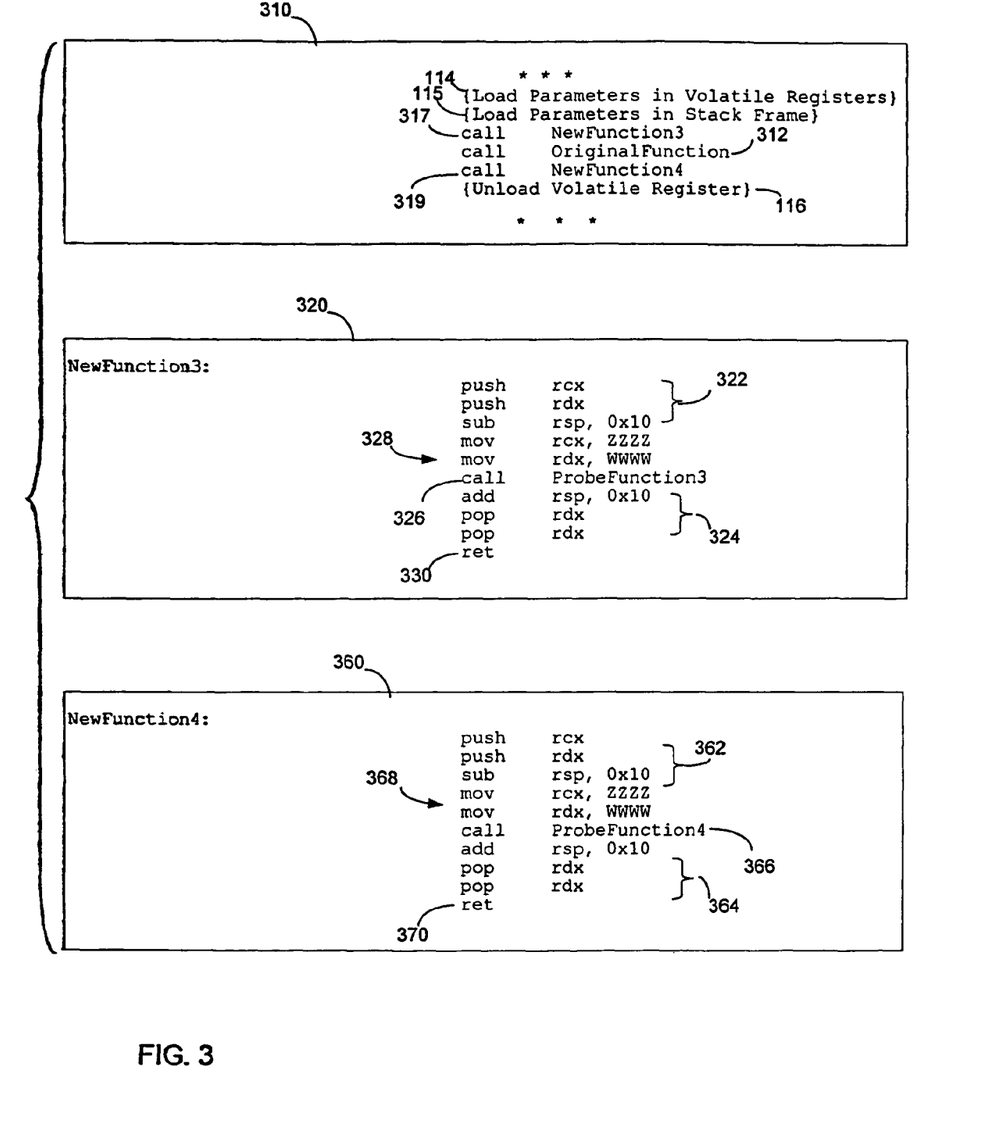
FIG. 3 is a representation of a modified program incorporating probe functions according to a further embodiment of the invention.

Turning now to FIG. 3, an example of an alternative embodiment is provided. FIG. 3 illustrates a portion of a calling program 310. In this embodiment, calling program 310 is instrumented with probes immediately preceding and immediately following a function call 312. As in the prior examples, each probe is inserted by adding a function call to a wrapper function. Function call 317 has the effect of adding a probe preceding function call 312. Function call 319 has the effect of adding a probe following execution of the function called by function call. In this example, the called function is not modified and may be, for example, function 150 as illustrated in FIG. 1.

Function call 317 calls wrapper function 320. Wrapper function 320 includes a prologue portion 322 and an epilogue portion 324. Prologue 322 establishes a stack frame and stores the state of volatile registers altered by the wrapper function 320 or the probe function called by wrapper function 320. In the described embodiment, it is not necessary for wrapper function 320 to store the state of nonvolatile registers that it does not directly alter because the state of those registers is preserved by the probe function. Epilogue 324 unwinds the stack frame and restores the value of the volatile registers stored in prologue 322. Function call 326 calls the probe function, which may be a probe as in the prior art. Precall instructions 328 pass parameters to the probe function in accordance with the function calling conventions of the platform.

Wrapper function 320 ends with a transfer of a control instruction, here return instruction 330. Return instruction 330 returns control to the called function 310 where function call 312 is executed. The net effect of executing the function call 317 is that a probe function is executed prior to function call 312, but that the calling conventions are satisfied.

Function call 319 calls a wrapper function 360. When executed, wrapper function 360 creates a stack frame that provides storage for volatile registers that may be altered through execution of either the wrapper function or the probe function called by wrapper function 360. Wrapper function 360 includes a prologue 362 that establishes the stack frame and stores the state of any volatile registers that may be altered as a result of wrapper function 360 or the probe function contained within it. Precall instructions 368 set the value of the parameters passed to the probe function called at function call 366. Epilogue 364 unwinds the stack frame and restores the state of the volatile registers stored in prologue 362.

Wrapper function 360 ends with a return instruction 370 that returns program execution to calling program 310. The next instructions executed in the calling program 310 are post call instructions 116. The net effect of executing the portion of calling program 310 illustrated in FIG. 3 is the same as execution of the portion of the calling program 110 illustrated in FIG. 1, except that a probe function is called before and after the call to the function designated "OriginalFunction."

Figure 4:
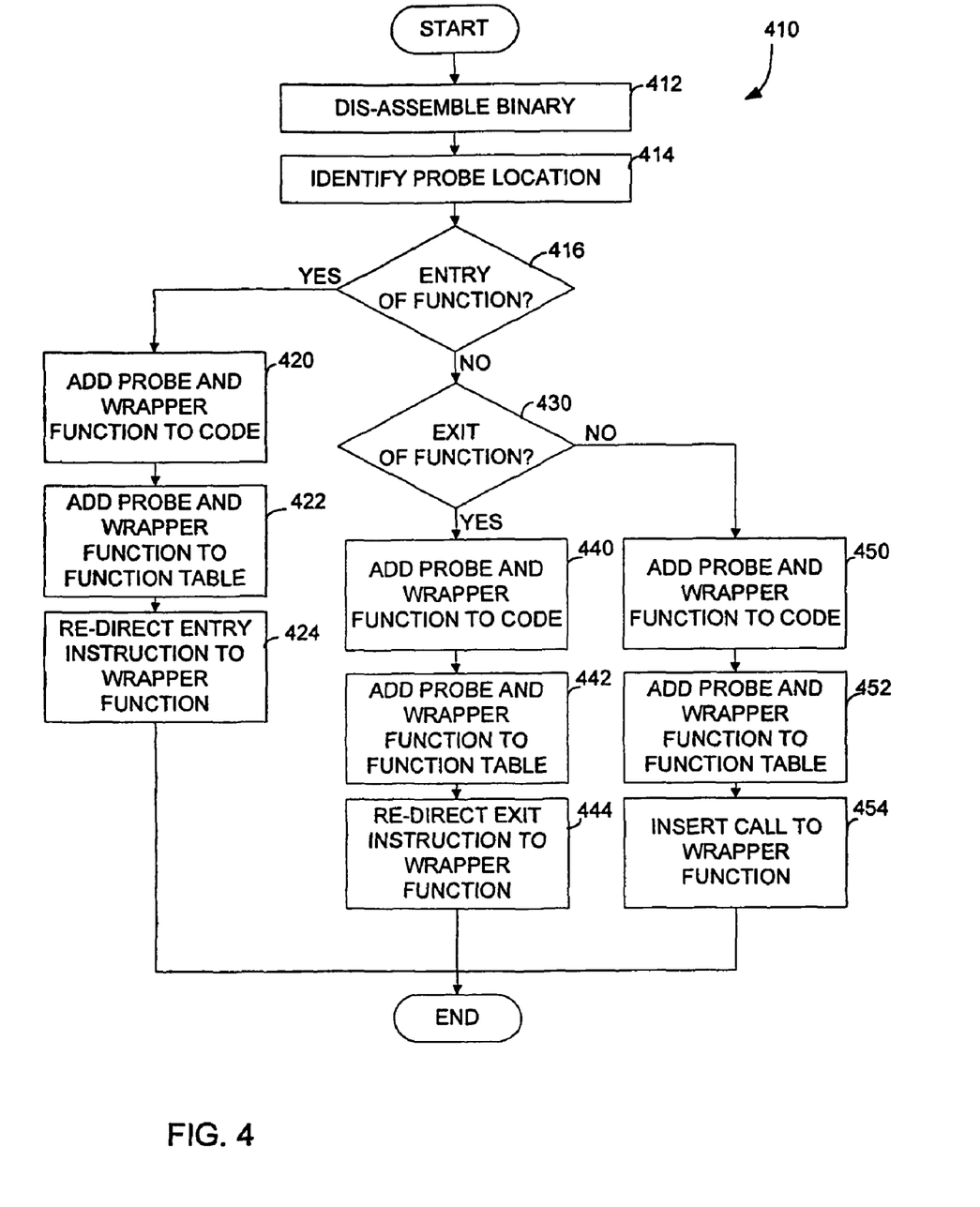
FIG. 4 is a flow chart of a process of implementing a program in accordance with the invention.

Turning now to FIG. 4, an example of a process by which a program may be instrumented is illustrated. FIG. 4 is a flow chart of a process 410 of instrumenting a program. In this embodiment, the program is already compiled or otherwise converted into an executable file, such as a "binary" or a DLL module. The executable file includes binary codes representing individual instructions that a processor running the program may execute. FIG. 4 may, for example, represent a process that results from a human developer using a performance analyzer tool in a software development environment. The process may be encoded as computer-executable instructions or by the combined action of human input and computer-executable instructions. FIG. 4 may for example, represent a process that results from a human developer using a performance analyzer tool in a software development environment.

The executable file also includes a function table, indicating where in the file each function is positioned. The function table includes information necessary to process exceptions or otherwise perform operations on the program. This information may, for example, include the size of a stack frame to be created for a function.

Process 410 begins at process block 412. At process block 412, the binary file is disassembled. The file may be disassembled in its entirety or selected portions may be disassembled. In the described embodiment, a sufficient portion of the binary is disassembled to allow a location for inserting a probe to be identified.

Existing program development environments often include disassembly tools so that human program developers may analyze or manipulate programs after the binary file has been created. A traditional disassembler may be used. In embodiments in which the code is displayed for a human user, the entire binary may be disassembled and human recognizable mnemonics may be generated for each instruction. In situations where probe locations will be identified automatically, it may be sufficient to disassemble the code only to the point of allowing recognition of the beginning or end of the instructions that precede and/or follow the locations where probes are to be inserted.

The process continues at process block 414. At process block 414, a location at which a probe is to be inserted is identified. In the described embodiment, the location of the probe is identified by a human user indicating a location through a user interface provided by the development environment.

The human user may indicate the location of one or more probes. In the example of FIG. 4, processing for a single probe is described. The user may, for example, indicate the location of a probe by pointing to a location in code displayed on the user interface. Alternatively, the user may indicate the location of one or more probes by specifying the characteristics of the locations at which probes are inserted. For example, a user interface may allow a human user to specify that probes are to be inserted before and after each function call in a particular region of the program or at the beginning and end of each function called from a particular module. The specific method by which the location of the probe is specified is not a limitation on the invention.

In the illustrated embodiment, the specific processing steps taken to insert a probe depend on the location at which the probe is inserted. Probes inserted at the entry of a function may be processed as illustrated by FIG. 2A. Probes inserted at the exit of a function may be processed as illustrated in FIG. 2B. Probes inserted at other locations, such as in a calling program before or after a function call, may be processed as illustrated in FIG. 3. Decision block 416 determines whether the specified location for the probe requires placement of a probe at the entry of a function. If so, processing proceeds to process block 420.

At process block 420, functions representing the probe to be added and the wrapper function are added to the binary file. These functions may be added by appending executable code to the end of the binary file or in any other convenient way. The probe may be a probe function as traditionally used to instrument code. The wrapper function may be as illustrated in connection with FIG. 2A, converted to binary codes that represent executable computer instructions.

At process block 422, the function table is updated to represent the added functions. Specifically, the probe and wrapper functions are added to the function table. To the extent the function table holds information about functions that is needed to process exceptions, that information is included in the function table. For example, entries in the function table may specify the size of the stack frame allocated for the function.

At process block 424, the binary code is modified to redirect any call to the instrumented function to the newly added wrapper function. In the embodiment illustrated in FIG. 2A, this change is made by replacing the target of a function call to the instrumented function with the wrapper function. The disassembled code is used to identify the specific bytes in the binary file that represent the target function and therefore need to be altered. This replacement may be made in the disassembled program or directly in the binary file. The wrapper function, as added to the code, ends with a transfer of control instruction to the beginning of the instrumented function.

If decision block 416 determines that the location for the probe is not at the entry to a function, processing continues to decision block 430. Decision block 430 determines whether the probe is to be inserted at the exit of a function.

If the probe is to be inserted at the exit of a function, processing proceeds to process block 440. At process block 440, a wrapper function and a probe function are added to the binary. As in process block 420, these functions may be added by appending executable code to the end of the binary file or in any other convenient way. The probe function may be as in the prior art. The wrapper function may be as illustrated in FIG. 2B, converted to binary codes that represent executable computed instructions.

At block 442, the function table in the binary file is updated to reflect the wrapper and probe functions added to the code. As in block 422, updating the function table includes identifying the added function as well as other information required for processing exceptions, such as the size of the stack frame allocated for the function.

At processing block 444, the exit instruction of the instrumented function is redirected to the wrapper function. As shown in FIG. 2B, this redirection may be accomplished by replacing the return instruction at the end of the instrumented function with a jump to the wrapper function. In this embodiment, the wrapper function added at step 440 ends with a return instruction that provides for an appropriate return to the calling program.

If decision block 430 determines that the probe location is not at the exit of a function, processing proceeds to process block 450. In the described embodiment, probe locations are constrained to function entrances, function exits or immediately before or immediately after a function call. If processing arrives at process block 450, the probe location is not a function entrance or exit and is therefore treated as being immediately preceding or following a function call.

At process block 450, a wrapper function and a probe function are added to the binary. As in process block 420, these functions may be added by appending executable code to the end of the binary file or in any other convenient way.

At block 452, the function table in the binary file is updated to reflect the wrapper and probe functions added to the code. As in block 422, updating the function table includes identifying the added function as well as other information required for processing exceptions, such as the size of the stack frame allocated for the function.

At process block 454, a call to the wrapper function is inserted at the appropriate location in the code to be instrumented. Adding a call instruction changes the length of the portion of the binary file representing the function to be instrumented. Where changing the length of the instrumented function impacts any of the information stored about the instrumented function, or other functions, stored in the binary file, that information is also updated. In this way, the binary file may still be properly executed even after the probes are added.

The process shown in FIG. 4 represents the steps needed to add one probe to a program. For testing one program, multiple probes are usually added. The process shown in FIG. 4 may be repeated for each probe to be inserted. In duplicating the process steps, some actions may be combined. For example, the function table may be updated for all added functions simultaneously. Or, the same probe or wrapper function may be used for multiple probe insertions, reducing the total number of functions that must be added to the function table or appended to the binary file.

Upon completion of processing to add all desired probes, the instrumented program may be executed. The probe functions, when called, may capture operating information about the instrumented program, such as by writing to a log file. This information may then be analyzed by a machine or processed for display to a human operator. Such information may then be used for debugging or analyzing the performance of the instrumented program.

Having thus described several aspects of at least one embodiment of this invention, it is to be appreciated various alterations, modifications, and improvements will readily occur to those skilled in the art.

For example, the specific order in which operations are performed is not critical to the invention. It is described that a binary file is disassembled to identify call instructions to original functions that are replaced with calls to new functions that in turn call probes. It does not matter whether the replacement is made by inserting a binary code into the binary file to call the new function or by modifying the disassembled code and then converting that code back to an executable code.

Also, the invention is described in connection with executable code that is stored as a binary file. The file structure used to store that information is not a limitation on the invention. Any arrangement of information that can be processed by a computer as an executable program may be considered an executable file. Moreover, the file containing the executable need not be limited to instructions and a function table. The executable may contain other information. Further, the executable need not contain a function table. Information needed to handle exceptions or otherwise execute code may be stored in any way. This information may be expressly stored or may be ascertainable by processing the file according to conventions established for the platform.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, one embodiment of the invention is directed to a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention. Likewise, the term "function" is used in a generic sense to refer to some portion of a program to which control may be transferred.

Some programming languages provide a specific construct called a function. Use of the term herein is not so limited. The term is intended to encompass portions of programs designated as subprograms, methods, procedures or by other names.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Such alterations, modifications, and improvements are intended to be part of this disclosure, and are intended to be within the spirit and scope of the invention. Accordingly, the foregoing description and drawings are by way of example only.

What is claimed is:

1. A method of instrumenting a software program, having a plurality of locations and an operating state when executed, with at least one probe function adapted to record information on the operating state at a location within the software program, the method comprising modifying the software program to cause a wrapper function to execute, the wrapper function comprising at least one computer-executable instruction that causes the probe function to execute, wherein modifying the software program comprises:

identifying a first location in a first function to be instrumented within the software program, the first function being distinct from the probe function and the wrapper function;

determining whether the first location is an entry point of the first function;

when the first location is an entry point of the first function:
    identifying an instruction in the software program that causes the first function to execute;
    replacing in the software program the instruction that causes the first function to execute with an instruction that causes the wrapper function to execute; and
    including within the wrapper function an instruction that causes the first function to execute;

determining whether the first location is an exit point of the first function; and when the first location is an exit point of the first function:
    identifying an instruction in the software program that is in the first function and that causes an instruction at a target location to execute;
    replacing in the software program the identified instruction with an instruction that causes the wrapper function to execute; and
    including within the wrapper function an instruction that causes the instruction at the target location to execute.

2. The method of claim 1, wherein the probe function comprises at least one computer-executable instruction that writes information on the operating state of the software program into a log file and the wrapper function comprises a wrapper function that stores information representing the operating state of the software program.

3. The method of claim 1, wherein:
    the software program is represented by at least one executable file;
    modifying the software program further comprises disassembling at least a portion of the at least one executable file; and
    the identifying, the replacing, and the including are performed on the disassembled portion of the at least one executable file.

4. The method of claim 3, wherein replacing in the at least one executable file the instruction that causes the first function to execute with an instruction that causes the wrapper function to execute comprises replacing a call to the first function with a call to the wrapper function.

5. The method of claim 4, wherein including within the wrapper function an instruction that causes the first function to execute comprises including within the wrapper function a jump instruction that has the first function as its target.

6. The method of claim 1, wherein the software program is represented by at least one executable file and modifying the software program further comprises:
    determining whether the first location is not an entry point of the first function and the first location is not an exit point of the first function;
    when the first location is not an entry point of the first function and the first location is not an exit point of the first function:
        inserting in the at least one executable file at the first location an instruction to execute that causes the wrapper function to execute; and
        including within the wrapper function an instruction that causes an instruction in the software program at a location adjacent to the first location to execute.

7. The method of claim 1, wherein the software program is represented by at least one executable file consisting essentially of instructions that may be processed by a processor with an X64 extension.

8. The method of claim 1, wherein the wrapper function comprises at least one computer-executable instruction that restores the operating state of the software program from stored information after the probe function is called.

9. The method of claim 1, wherein the instruction that causes an instruction at a target location to execute comprises a return instruction.

10. A method of testing a software program having a plurality of locations on a platform having registers having values and a calling convention in which the values in at least one of the registers is preserved upon a function call, the method being of the type that includes executing at least one probe function from a wrapper function to instrument an instrumented location in a first function in the program, the first function being distinct from the wrapper function and being distinct from the probe function, and further comprising executing the software program by:
   when the instrumented location is the entry point of the first function:
      executing an instruction that causes the wrapper function to execute in the place of an instruction that causes the first function to execute; and
      from within the wrapper function;
      preserving the state of the platform;
      calling the probe function;
      restoring the state of the platform; and
      executing an instruction that causes the first function to execute; and
   when the instrumented location is the exit point of the first function:
      executing from within the first function a jump instruction having the wrapper function as a target; and
      from within the wrapper function:
         preserving the state of the platform;
         calling the probe function;
         restoring the state of the platform; and
         executing a return instruction.

11. The method of testing a software program of claim 10, wherein executing an instruction that causes the wrapper function to execute additionally comprises forming a stack frame for the wrapper function.

12. The method of testing a software program of claim 11, wherein preserving the state of the platform comprises storing the value of at least one register in the stack frame for the wrapper function.

13. The method of testing a software program of claim 10, wherein:
   executing an instruction that causes the wrapper function to execute comprises executing a call instruction having the wrapper function as a target; and
   executing an instruction that causes the first function to execute comprises executing a jump instruction having the first function as a target.

14. The method of testing a software program of claim 10, wherein the method further comprises:
   when the instrumented location is not the entry point of the first function and is not the exit point of the first function:
      executing a call instruction having the wrapper function as a target; and
      from within the wrapper function:
         preserving the state of the platform;
         calling the probe function;
         restoring the state of the platform; and
         executing a return instruction.

15. A computer-readable medium having computer-executable instructions for implementing a development environment for a software program, the computer-executable instructions performing steps comprising:
   a) modifying a binary file containing an executable version of the software program to include a probe function and a wrapper function that calls the probe function;
   b) identifying a first function in the binary file where a probe function is to be executed, the first function being distinct from the wrapper function and from the probe function; and
   c) replacing a return instruction in the first function with a jump instruction having the wrapper function as a target.

16. The computer-readable medium of claim 15, wherein the computer-executable instructions performing steps comprising identifying an identified location in the binary file comprise computer-executable instructions performing steps that comprise receiving input from a human.

17. The computer-readable medium of claim 15, wherein the computer-executable instructions performing steps comprising modifying a binary file comprise computer-executable instructions performing steps that comprise appending an executable version of the wrapper function and the probe function to the binary file.

18. The computer-readable medium of claim 17, wherein the computer-executable instructions performing steps comprising modifying a binary file further comprise computer-executable instructions performing steps that comprise modifying a function table to contain identifying information concerning the wrapper function.

19. The computer-readable medium of claim 17, wherein the computer-executable instructions performing steps comprising providing at the identified location an instruction that causes the wrapper function to execute computer-executable instructions performing steps that comprise altering a portion of the binary file representing an instruction of the software program.

* * * * *

UNITED STATES PATENT AND TRADEMARK OFFICE
CERTIFICATE OF CORRECTION

| | | |
|---|---|---|
| PATENT NO. | : 7,757,218 B2 | Page 1 of 1 |
| APPLICATION NO. | : 11/088452 | |
| DATED | : July 13, 2010 | |
| INVENTOR(S) | : Ishai Ben Aroya | |

It is certified that error appears in the above-identified patent and that said Letters Patent is hereby corrected as shown below:

In column 13, line 27, in Claim 10, delete "function;" and insert -- function: --, therefor.

Signed and Sealed this
Eighth Day of February, 2011

David J. Kappos
*Director of the United States Patent and Trademark Office*